(12) United States Patent
Lin et al.

(10) Patent No.: US 10,565,341 B2
(45) Date of Patent: Feb. 18, 2020

(54) CONSTRAINED CELL PLACEMENT

(71) Applicant: Taiwan Semiconductor Manufacturing Co., Ltd., Hsinchu (TW)

(72) Inventors: Yen-Hung Lin, Hsinchu (TW); Chung-Hsing Wang, Hsinchu County (TW); Yuan-Te Hou, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 116 days.

(21) Appl. No.: 15/878,818

(22) Filed: Jan. 24, 2018

(65) Prior Publication Data

US 2018/0330034 A1    Nov. 15, 2018

Related U.S. Application Data

(60) Provisional application No. 62/506,037, filed on May 15, 2017.

(51) Int. Cl.
G06F 17/50 (2006.01)

(52) U.S. Cl.
CPC ...... G06F 17/5072 (2013.01); *G06F 2217/06* (2013.01)

(58) Field of Classification Search
USPC .......................... 716/110, 118, 119, 120, 126
See application file for complete search history.

(56) References Cited

U.S. PATENT DOCUMENTS

| | | | |
|---|---|---|---|
| 6,938,226 B2 | 8/2005 | Nguyen et al. | |
| 9,563,733 B2 | 2/2017 | Becker | |
| 9,589,811 B2 | 3/2017 | Ruffell | |
| 9,870,979 B2* | 1/2018 | Batra | H01L 24/24 |
| 9,984,191 B2 | 5/2018 | Hsieh et al. | |
| 2007/0097723 A1* | 5/2007 | Sachan | G11C 15/04 |
| | | | 365/49.17 |
| 2008/0239780 A1* | 10/2008 | Sasaki | G11C 5/025 |
| | | | 365/51 |

(Continued)

FOREIGN PATENT DOCUMENTS

| | | |
|---|---|---|
| TW | 201608402 A | 3/2016 |
| TW | 201701480 A | 1/2017 |

*Primary Examiner* — Brian Ngo
(74) *Attorney, Agent, or Firm* — Sterne, Kessler, Goldstein & Fox P.L.L.C.

(57) ABSTRACT

The present disclosure describes an example method for cell placement in an integrated circuit layout design. The method includes retrieving, from a cell library, first and second cells each including a first local metal track proximate to a top boundary and a second local metal track proximate to a bottom boundary. The method includes placing, by a processor, the first and second cells in a layout area including global metal tracks of first and second types. Each global metal track of the first type and each global metal tracks of the second type alternate between one another in the layout area. The first and second local metal tracks of the first cell is aligned with adjacent first global metal track of the first and second types, respectively. The first and second local metal tracks of the second cell is aligned with adjacent second global metal track of the first and second types, respectively.

20 Claims, 12 Drawing Sheets

(56) References Cited

U.S. PATENT DOCUMENTS

| | | | |
|---|---|---|---|
| 2010/0070942 A1* | 3/2010 | Madurawe | G06F 17/5068 |
| | | | 716/128 |
| 2013/0154128 A1* | 6/2013 | Wang | H01L 23/5286 |
| | | | 257/786 |
| 2017/0032073 A1* | 2/2017 | Chen | G06F 17/5077 |
| 2018/0182467 A1* | 6/2018 | Kang | G11C 29/4401 |

* cited by examiner

CONSTRAINED CELL PLACEMENT

CROSS-REFERENCE TO RELATED APPLICATION

This application claims the benefit of U.S. Provisional Patent Application No. 62/506,037, titled "Constrained Placement for Heterogeneous PG-Structure Cells," which was filed on May 15, 2017 and is incorporated herein by reference in its entirety.

BACKGROUND

An electronic design automation (EDA) tool can be used for an integrated circuit (IC) design flow. For example, the EDA tool can be used to place standard cells (e.g., cells that implement logic or other electronic functions) in an IC layout design. As technology increases and the demand for scaled ICs grows, EDA tools become increasingly important to aid in the design of complex IC layout designs.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

DETAILED DESCRIPTION

Figure 1:
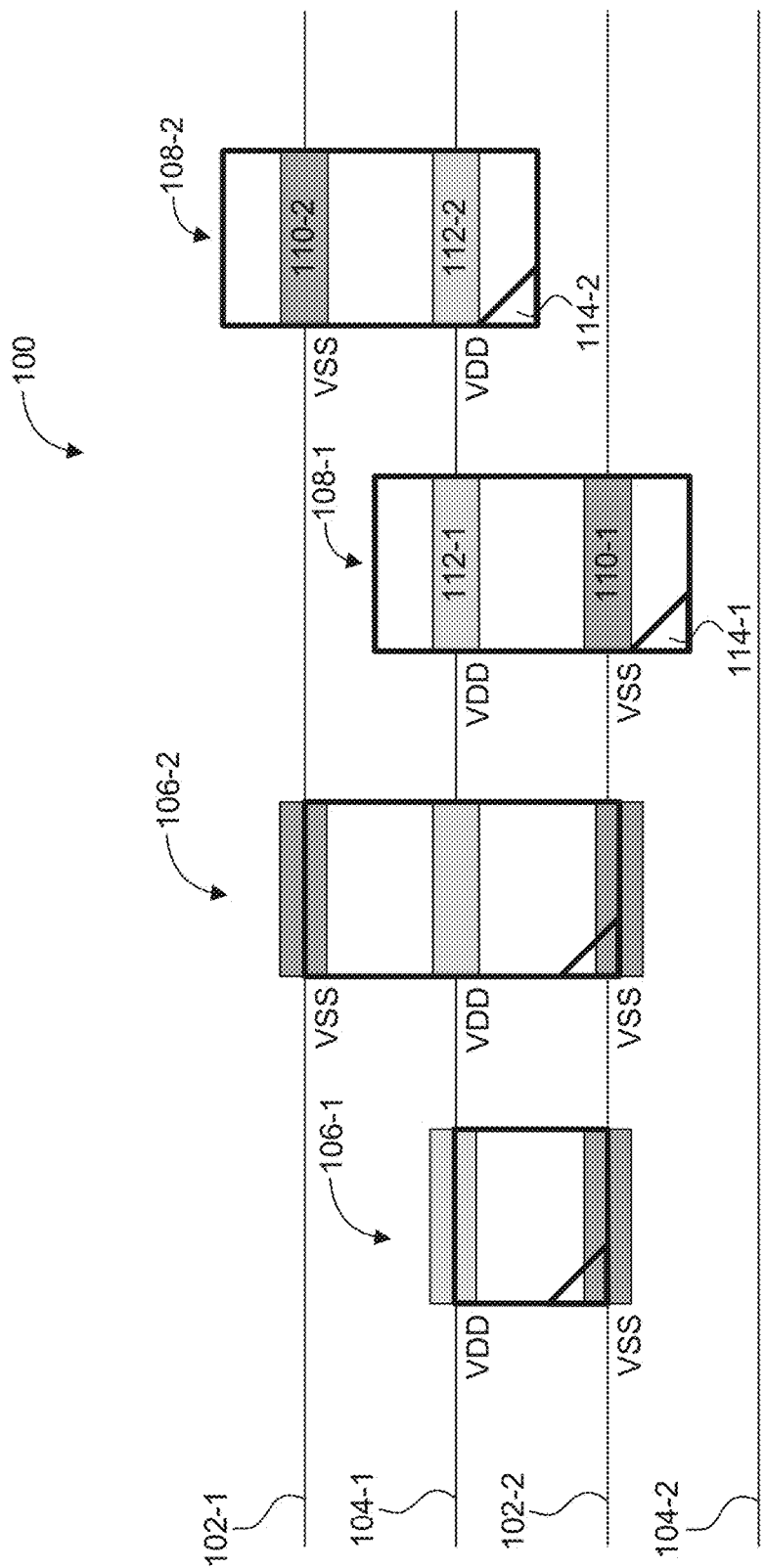
FIG. 1 is an illustration of example in-boundary power-ground (IBPG) cells and out-boundary power-ground (OBPG) cells in a layout area, according to some embodiments of the present disclosure.

The following disclosure provides many different embodiments, or examples, for implementing different features of the provided subject matter. Specific examples of components and arrangements are described below to simplify the present disclosure. These are merely examples and are not intended to be limiting. In addition, the present disclosure repeats reference numerals and/or letters in the various examples. This repetition is for the purpose of simplicity and clarity and, unless indicated otherwise, does not in itself dictate a relationship between the various embodiments and/or configurations discussed.

The following disclosure relates to optimizing placement of standard cells (e.g., cells that implement logic or other electronic functions) in an IC layout design. In some embodiments, a cell library includes cells (e.g., IBPG cells) with unified local metal track (e.g., power-ground (PG) lines) locations. For example, for each IBPG cells with unified PG line locations, the relative locations of the power line and ground line with respect to a reference point can be the same. The cells in the cell library are placed in an IC layout area having global metal tracks (e.g., PG lines) with constrained orientations for each cell. For example, for each IBPG cells with constrained orientations, the relative orientation of the cell with respect to the reference point can be the same. In some embodiments, unified local metal track locations are not required for cells (e.g., IBPG cells) in the cell library. The cells in the cell library can be placed in the IC layout area with constrained local metal track (e.g., PG lines) locations for each cell. By utilizing embodiments of the cell placement methods disclosed herein, dead spaces between cells (e.g., IBPG cells) can be reduced or eliminated, which in turn optimizes the placement of standard cells.

FIG. 1 is an illustration of example in-boundary power-ground (IBPG) cells 108 and out-boundary power-ground (OBPG) cells 106 in a layout area 100, according to some embodiments of the present disclosure. Layout area 100 may be a portion of a larger IC layout design (not shown). Layout area 100 may include a plurality of global metal tracks arranged in parallel, including a set of first global metal tracks 104 and a set of second global metal tracks 102. First global metal tracks 104 and second global metal tracks 102 may alternate between one another in layout area 100. For example, as shown in FIG. 1, a second global metal track 102-1 is arranged above a first global metal track 104-1, which is arranged above another second global metal track 102-2. Second global metal track 102-2 is arranged above another first global metal track 104-2. As disclosed herein, metal tracks 102 and 104 are considered "global" as they are laid across an entire width of layout area 100. In some embodiments, the distances (or heights) between alternating first global metal tracks 104 and second global metal tracks 102 are equal. In other words, a pitch (or spacing) between first global metal tracks 104 and second global metal tracks 102 may be uniform (or near uniform), according to some embodiments. In some embodiments, each of first global metal tracks 104 corresponds to (or is mapped to) a power line VDD, and each of second global metal tracks 102 corresponds to (or is mapped to) a ground line VSS.

In referring to FIG. 1, a plurality of standard cells are placed in layout area 100, including OBPG cells 106 and IBPG cells 108. In some embodiments, standard cells (either IBPG cells or OBPG cells) may have different widths (e.g., may be laid across a different number of placement sites), depending on the functionality of the cell. Each placement site may have a unit width for placing the standard cell with the minimum width. For example, a standard cell with a low-complexity logic function (e.g., an inverter logic function) can occupy a single placement site, while a standard cell with a medium complexity logic function (e.g., multiple logic gates coupled to one another to perform a specified function) can occupy multiple placement sites.

In some embodiments, IBPG cells 108 have equal (or near equal) height (measured between top and bottom boundaries of the cell). The height can be, for example, equal to twice the distance between adjacent first and second global metal tracks 104 and 102. That is, the pitch between first global metal tracks 104 and second global metal tracks 102 may be one-half of the height of IBPG cell 108. In some embodiments, each IBPG cell 108 includes a first local metal track 112 and a second local metal track 110. Both first local metal track 112 and second local metal track 110 in IBPG cell 108 can be located proximate to the top and bottom boundaries of IBPG cell 108. In some embodiments, first local metal track 112 and second local metal track 110 in IBPG cell 108 are not at (or on) the top boundary or the bottom boundary of IBPG cell 108. As disclosed herein, a standard cell is considered "in-boundary" when both first and second local metal tracks are within, and not at, the top and bottom boundaries of the standard cell.

Each of first local metal track 112 and second local metal track 110 may be laid across the entire width of IBPG cell 108. In some embodiments, each of first local metal tracks 112 corresponds (or is mapped) to a power line VDD, and each of second local metal tracks 110 corresponds (or is mapped) to a ground line VSS. Once IBPG cells 108 are placed in layout area 100, each first local metal track 112 within IPBG cells 108 may align with one of first global metal tracks 104, and each second local metal track 110 within IPBG cells 108 may align with one of second global metal tracks 102. For example, as shown in FIG. 1, local power line VDD 112-1 of IBPG cell 108-1 and local power line VDD 112-2 of IBPG cell 108-2 align with global power line VDD 104-1; local ground line VSS 110-2 of IBPG cell 108-2 aligns with global ground line VSS 102-1; and local ground line VSS 110-1 of IBPG cell 108-1 aligns with global ground line VSS 102-2.

Each IBPG cell 108 may also include a reference point (or origin) 114 for determining the orientation of each IBPG cell 108 in layout area 100 after placement. For example, as shown in FIG. 1, each of IBPG cells 108-1 and 108-2 has a common orientation relative to the respective reference point 114-1 and 114-2 after placement, e.g., at the bottom-left corner. Reference point 114 may be used for determining the relative locations of first and second local metal tracks 112 and 110 within IBPG cell 108. For example, as shown in FIG. 1, for IBPG cell 108-1, second local metal track 110-1 is closer to reference point 114-1 than first local metal track 112-1; for another IBPG cell 108-2, first local metal track 112-2 is closer to reference point 114-2 than second local metal track 110-2 relative to reference point 114-2. It is to be appreciated that since the locations of first and second local metal tracks 112 and 110 of IBPG cell 108 described above are "relative locations" with respect to the respective reference point 114-1 or 114-2, as opposed to with respect to layout area 100, the relative locations are independent of the way how IBPG cell 108 will be placed in layout area 100 (e.g., flipped or not). The orientation of IBPG cell 108, however, is determined by the way how IBPG cell 108 is placed in layout area 100.

In some embodiments, the heights of OBPG cells 106 may vary. For example, the height of OBPG cell 106 can be one or more times the distance between adjacent first and second global metal tracks 104 and 102. OBPG cell 106 can include at least two local metal tracks: one or more first local metal tracks, and one or more second local metal tracks. Two of the at least two local metal tracks in OBPG cell 106 can be located at (or on) the top and bottom boundaries of OBPG cell 106. In some embodiments, the two local metal tracks in OBPG cell 106 are not within the top and bottom boundaries of OBPG cell 106. As disclosed herein, a standard cell is considered "out-boundary" when two local metal tracks are at, and not within, the top and bottom boundaries of the standard cell. OBPG cell 106 includes a reference point.

In referring to FIG. 1, OBPG cell 106-1 has a height that is equal to the distance between adjacent first and second global metal tracks 104 and 102, according to some embodiments. OBPG cell 106-1 includes two local metal tracks: a local power line VDD and a local ground line VSS at the top boundary and bottom boundary, respectively. Another OBPG cell 106-2 has the height that is equal to twice the distance between adjacent first and second global metal tracks 104 and 102. OBPG cell 106-2 includes three two local metal tracks: one local power line VDD located at the middle of OBPG cell 106-2, and two local ground lines VSS locating at (or on) the top boundary and bottom boundary, respectively, of OBPG cell 106-2.

In some embodiments, a layout area having both IBPG cells 108 and OBPG cells 106 after placement can be considered "heterogeneous," and a layout area having only IBPG cells 108 or only OBPG cells 106 after placement is considered "homogeneous." As technology increases and the demand for scaled ICs grows, an increasing number of standard cells are required to fit in smaller IC layout designs, thus creating challenges for IC manufacturers. In some embodiments, a homogeneous layout area having only IBPG cells 108 may be desirable for optimized IC layout designs.

Figure 2:
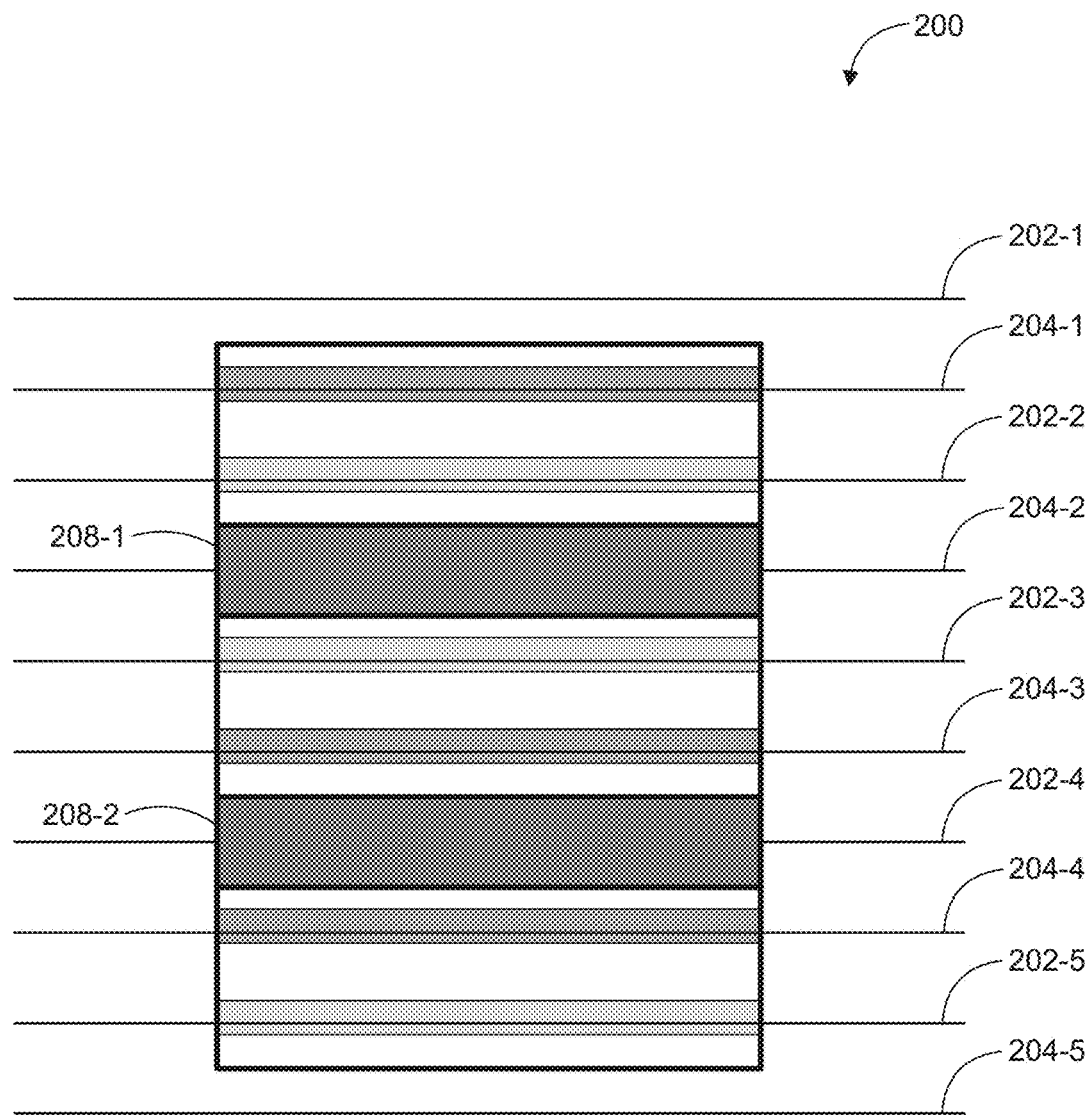
FIG. 2 is an illustration of example dead areas in a layout area caused by unconstrained IBPG cell placement methods.

However, homogeneous OBPG cells in a layout area may cause fragmentations between the IBPG cells after placement, in which the fragmentations may not be able to be utilized by other cells. These unusable fragmentations (dead areas) may impede EDA tools in optimization by adding or sizing cells. FIG. 2 is an illustration of example dead areas 208 in a layout area 200 caused by unconstrained IBPG cell placement methods. In this example, layout area 200 includes a plurality of first global metal tracks 202 and a plurality of second global metal tracks 204. After three IBPG cells 206 are placed in layout area 200, the spacing with one-cell height between adjacent IBPG cells 206 along the height of layout area 200 cannot be used by any other standard cells (e.g., by either IBPG cells or OBPG cells) and thus are considered "dead areas."

Embodiments of the present disclosure address this problem, among others, by constraining IBPG cells placement locations. As a result, dead areas between IBPG cells after placement can be removed, thereby facilitating EDA tools to optimally place cells in the layout design.

Figure 3:
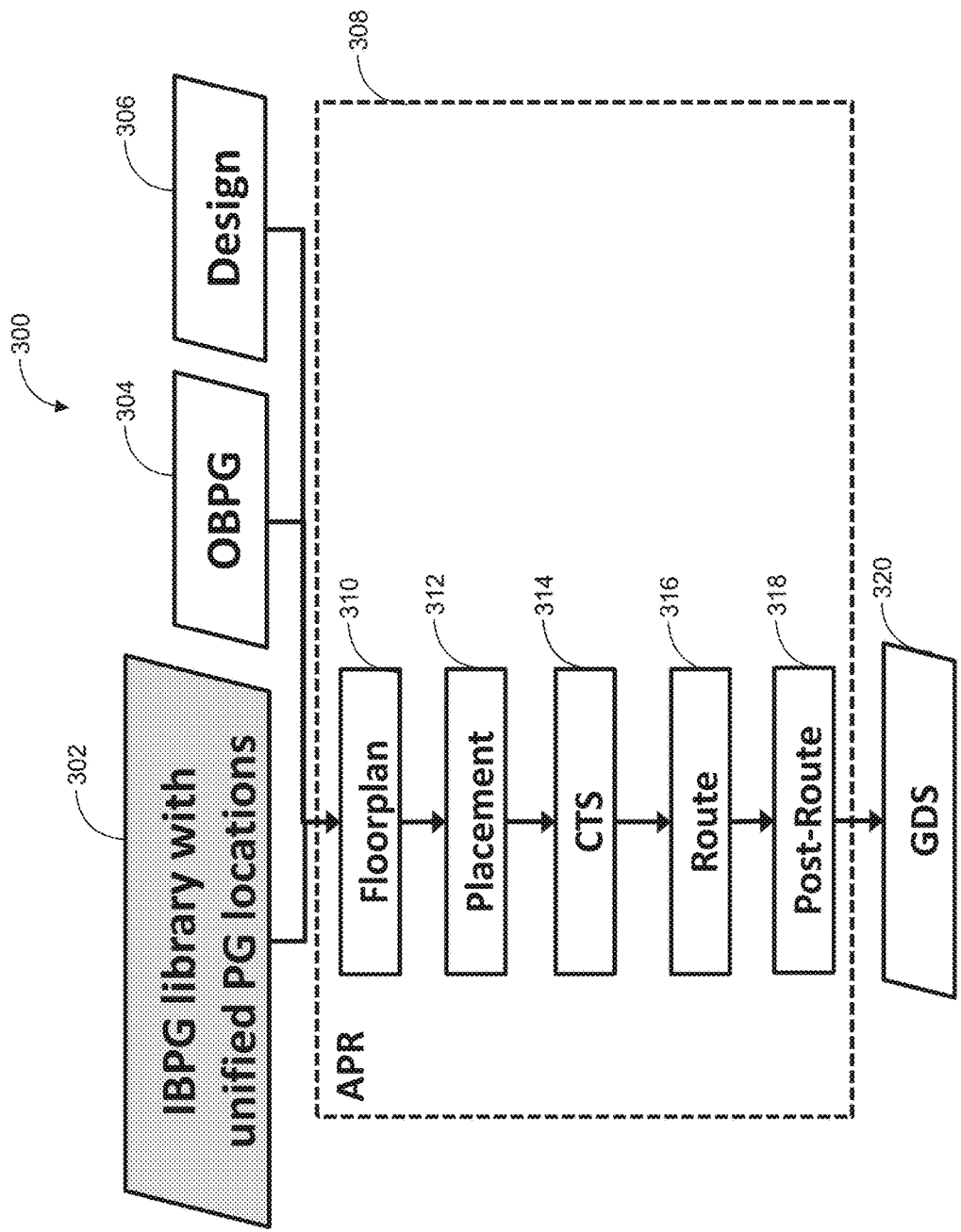
FIG. 3 is an illustration of an example diagram of an IC design flow using constrained cell placement, according to some embodiments of the present disclosure.

FIG. 3 is an illustration of an example diagram of an IC design flow 300 using constrained cell placement, according to some embodiments of the present disclosure. IC design flow 300 may be performed by an EDA tool. IC design flow 300 includes automatic placement and routing (APR) stage 308, which is part of physical design flow of an IC. In some embodiments, APR stage 308 may include multiple sub-stages, including floor plan 310, placement 312, clock tree synthesis (CTS), 314, route 316, and post-route 318. In some embodiments, APR stage 308 starts with obtaining inputs, including IBPG cell library 302, OBPG cell library 304, and design 306, e.g., register transfer level (RTL) design. The output of APR stage 308 may include IC layouts that can be converted into a mask work in a graphic database system (GDS) format 320 or any other suitable formats, such as open artwork system interchange standard (OASIS) format.

In some embodiments, floor plan 310 may assign design 306 of the IC to gross regions of the chip, assign input/output (I/O) pins, and place large objects (e.g., arrays, cores, etc.). Placement 312 may place cells (e.g., IBPG cells and/or OBPG cells) in cell libraries (e.g., IBPG cell library 302 and/or OBPG cell library 304) to non-overlapping locations in the layout area. CTS 314 may introduce clock signal wires (e.g., clock trees) into the design. Route 316 may add the wires that connect the cells placed during placement 312. Post-route 318 may include removing performance (time closure), noise (signal integrity), and yield violations. In some embodiments, post-route 318 may also include iterative refinements of cell and wire placement based on global routing and clock timing optimization.

In referring to FIG. 3, the constrained IBPG cell placement may be achieved by introducing unified PG locations to IBPG cells in IBPG cell library 302 and mandating constrained-orientations of the IBPG cells during placement in APR stage 308. It is to be appreciated that the IBPG cell placement may occur in placement 312, or any other suitable sub-stages of APR stage 308, such as CTS 314 or post-route 318. The details of IPBG cell library 302 with unified PG locations and the constrained-orientation IBPG cell placement are described below with respect to FIGS. 4-7.

Figure 4A:
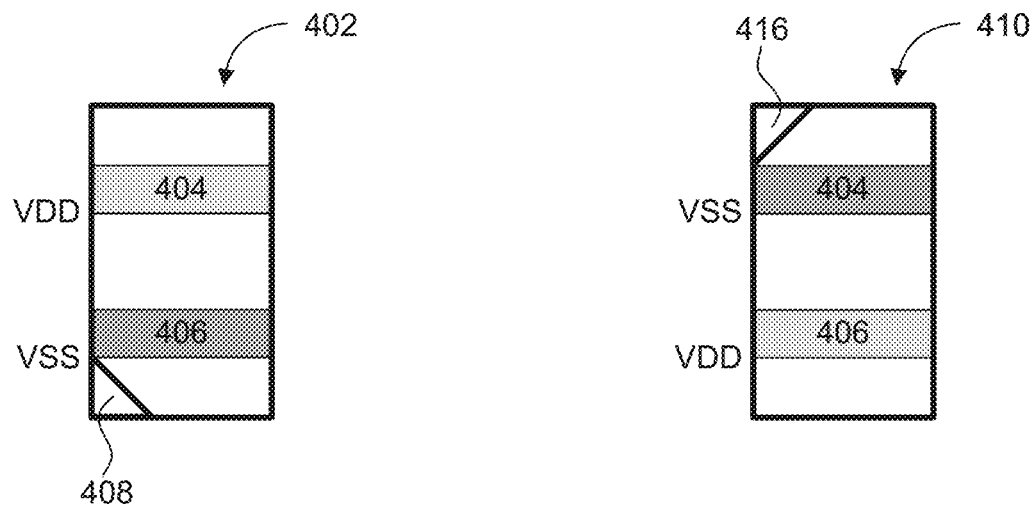
FIGS. 4A and 4B are illustrations of example IBPG cells with unified power-ground (PG) locations, according to some embodiments of the present disclosure.
Figure 4B:
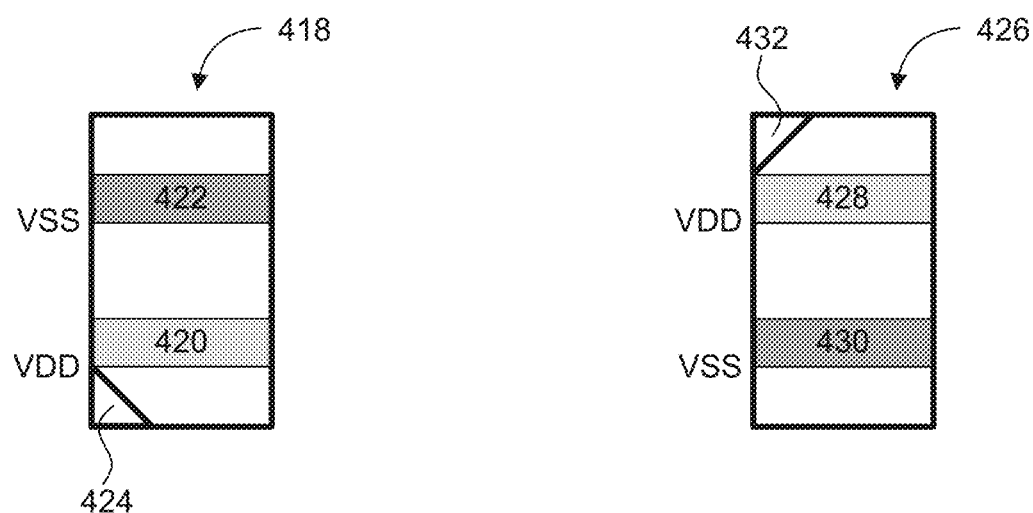

FIGS. 4A and 4B are illustrations of example IBPG cells with unified PG locations, according to some embodiments of the present disclosure. In some embodiments, IPBG cell library 302 may include IPBG cells 402 and 410, each of which has unified PG locations relative to the respective reference point. In some embodiments, IPBG cell library 302 may include IPBG cells 418 and 426, each of which has unified PG locations relative to the respective reference point. In some embodiments as shown in FIG. 4A, for each IPBG cell 402 or 410, the first local metal track (e.g., the ground line VSS) is closer to a respective reference point than the second local metal track (e.g., the power line VDD). For example, for IBPG cell 402, ground line VSS 406 is closer to reference point 408 than power line VDD 404; for IBPG cell 410, ground line VSS 414 is closer to reference point 416 than power line VDD 412. That is, the relative PG locations with respect to the reference point in each IPBG cell are fixed in FIG. 4A, e.g., the power line VDD is farther away from the reference point than the ground line VSS. It is to be appreciated that the locations of the reference point and PG lines can vary for each IBPG cell.

In some embodiments as shown in FIG. 4B, for each IPBG cell 418 or 426, the first local metal track (e.g., the power line VDD) is closer to a reference point than the second local metal track (e.g., the ground line VSS). For example, for IBPG cell 418, power line VDD 420 is closer to reference point 424 than ground line VSS 422; for IBPG cell 426, power line VDD 428 is closer to reference point 432 than ground line VSS 430. That is, the relative PG locations with respect to the reference point in each IPBG cell are fixed in FIG. 4B, e.g., the ground line VSS is farther away from the reference point than the power line VDD. It is to be appreciated that the locations of the reference point and PG lines can vary for each IBPG cell.

IBPG cell library 302 in FIG. 3 may include IBPG cells with unified relative PG locations as shown in FIG. 4A or may include IBPG cells with unified relative PG locations as shown in FIG. 4B. In other words, for each IBPG cell in IBPG cell library 302, the first local metal track is closer to a reference point than the second local metal track. It is to be appreciated that the IBPG cells in FIG. 4A cannot be mixed with the IBPG cells in FIG. 4B in some embodiments as the relative PG locations then become no longer unified for the IBPG cells in IBPG cell library 302. For example, IBPG cell 402 in FIG. 4A and IBPG cell 418 in FIG. 418 have different relative PG locations.

Figure 5:
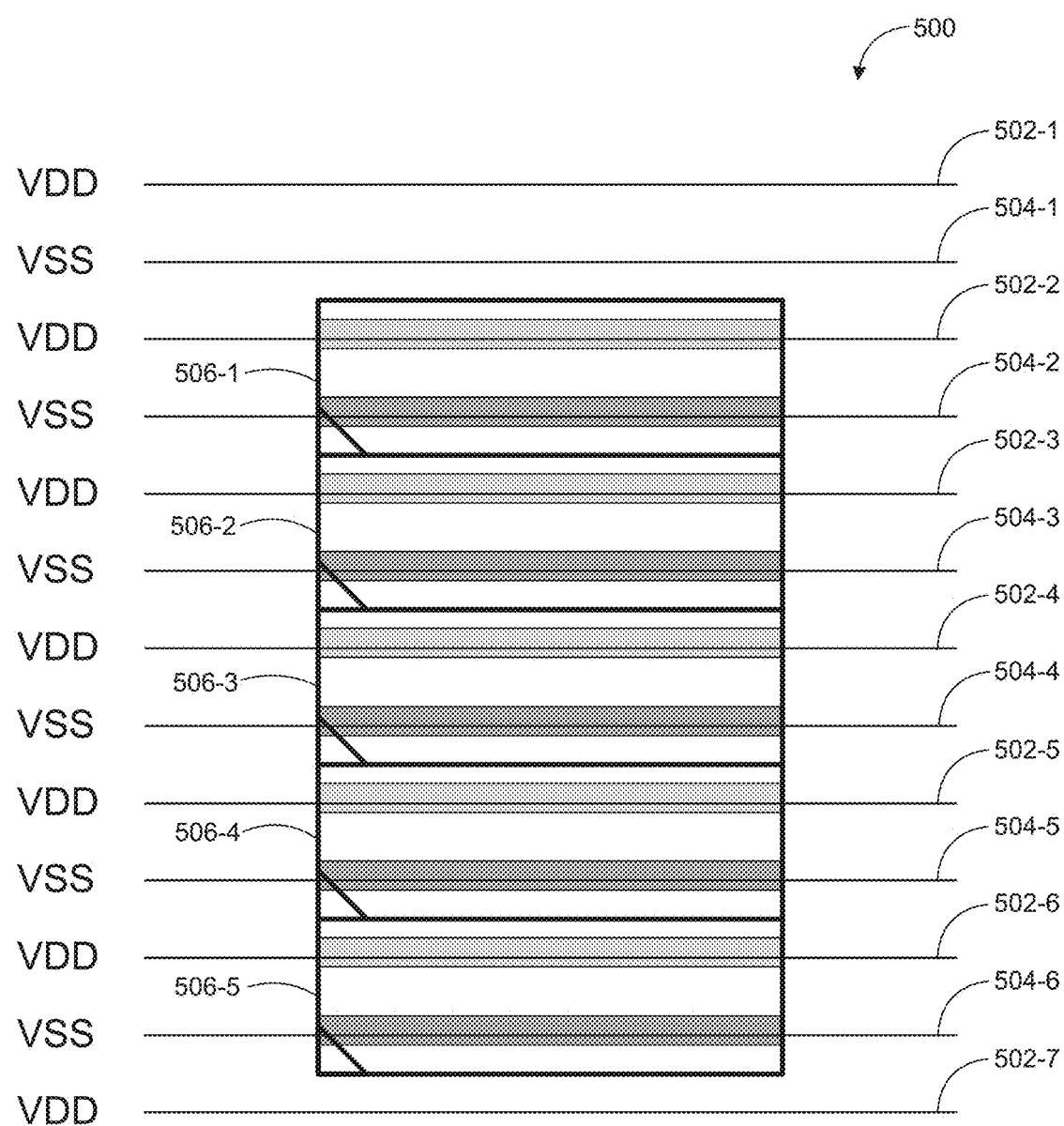
FIG. 5 is an illustration of an example IBPG cell placement with constrained-orientations, according to some embodiments of the present disclosure.

FIG. 5 is an illustration of an example IBPG cell placement with constrained-orientations, according to some embodiments of the present disclosure. A layout area 500 may include a plurality of first global metal tracks 502 (e.g., power lines VDD) and a plurality of second global metal tracks 504 (e.g., ground lines VSS). First and second global metal tracks 502 and 504 may alternate between one another in layout area 500 with a uniform (or near uniform) pitch. Once IBPG cells 506 with unified PG locations from IBPG cell library 302 are placed in layout area 500. IBPG cells 506-1-506-5 have the same relative PG locations, like IBPG cell 402 shown in FIG. 4A. During placement, for each IBPG cell 506, the first local metal track (e.g., local power line VDD) may align with one of first global metal tracks 502 (e.g., global power lines VDD), and the second local metal track (e.g., local ground line VSS) may align with one of second global metal tracks 504 (e.g., global ground lines VSS). Also, as shown in FIG. 5, after placement, each IBPG cell 506 has a common orientation relative to the respective reference point. For example, the reference points of IBPG cells 506 are at the bottom-left corner of respective IBPG cell 506. Since IBPG cells 506 from IBPG cell library 302 cannot be vertically (along the height) flipped during placement, the orientations of these cells are constrained.

Thus, by imposing constraints on the relative PG locations with respect to the reference point for each IBPG cell 506 in IBPG cell library 302 and constraints on the orientation with respect to the reference point for each IBPG cell 506 after placement, the first local metal track (e.g., local power line VDD) is above the second local metal track (e.g., local ground lines VSS) for each placed IBPG cell 506, according to some embodiments. It is to be appreciated that in some embodiments, the first local metal track may correspond to a ground line VSS and the second local metal track may correspond to a power line VDD. Nevertheless, by ensuring that for each placed IBPG cell, the first local metal track is above the second local metal track, dead areas can be avoided between IBPG cells because any space between IBPG cells along the height can fit at least one IBPG cell. In contrast, as shown in FIG. 2, for placed IBPG cell 206-2, the first local metal track is above the second local metal track in layout area 200, while for other placed IBPG cells 206-1 and 206-3, the second local metal track is above the first local metal track in layout area 200. Thus, dead areas 208 are formed between IBPG cells 206 in FIG. 2.

Figure 6:
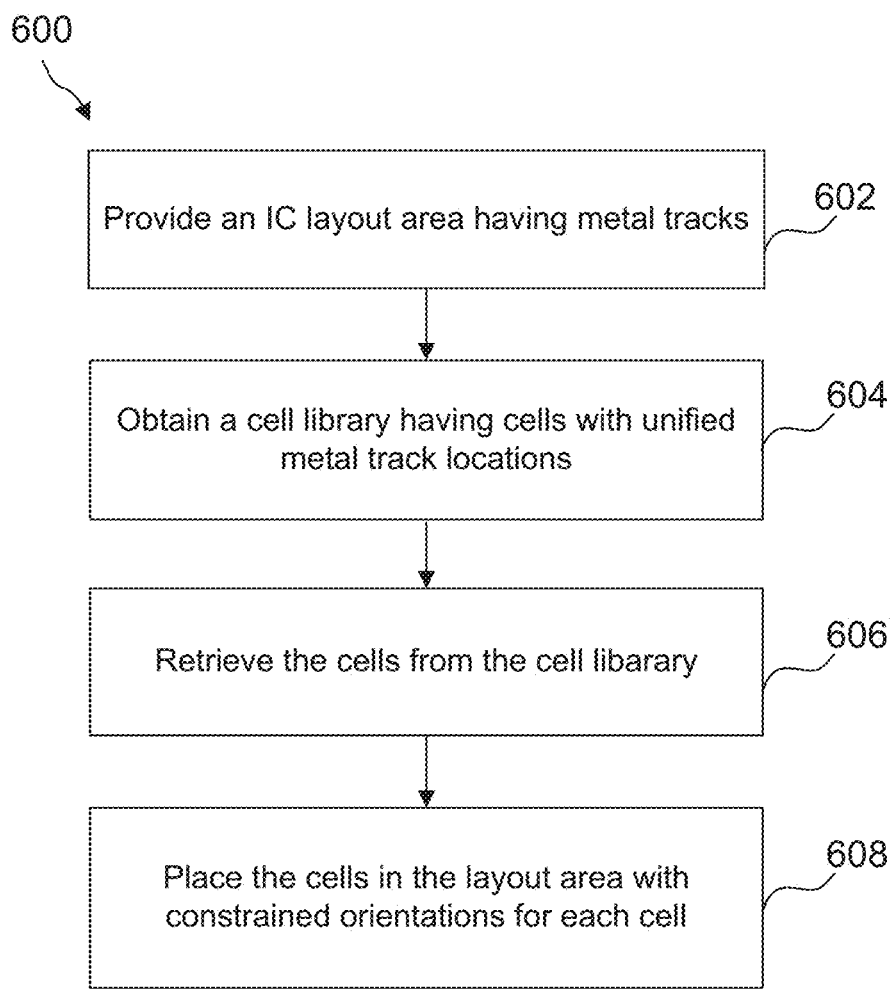
FIG. 6 is an illustration of a method for placing cells in layout, according to some embodiments of the present disclosure.

FIG. 6 is an illustration of a method 600 for placing cells in a layout area, according to some embodiments of the present disclosure. The operations depicted in method 600 can be performed by, for example, an EDA tool that operates on a computer system, such as an example computer system 1000 described below with respect to FIG. 10. It is to be appreciated that not all operations may be needed to perform the disclosure provided herein and that one or more additional operations may be performed. Further, some of the operations may be performed concurrently or in a different order than shown in FIG. 6.

In operation 602, an IC layout having two types of global metal tracks may be provided. Each of the plurality of global metal tracks of the first type and each of the plurality of global metal tracks of the second type may alternate between one another in the layout area. For example, as shown in FIG. 5, layout area 500 is provided with alternating power lines VDD 502 and ground lines VSS 504. The distance between alternating power lines VDD 502 and ground lines VSS 504 is equal (or near equal), according to some embodiments.

In operation 604, a cell library having cells with unified local metal track locations may be obtained. Each cell may include a first local metal track proximate to a top boundary and a second local metal track proximate to a bottom boundary. For example, as shown in FIGS. 4A and 4B, IBPG cells 402 and 410 or IBPG cells 418 and 426 from IBPG cell library 302 include local power lines VDD and local ground lines VSS with the unified locations with respect to the respective reference point in each IBPG cell.

In operation 606, the cells may be retrieved from the cell library. An EDA tool can retrieve, either automatically or by manual instruction, a cell from the cell library before placing the cell in the layout area.

In operation 608, the cells may be placed in the layout area with constrained orientations for each cell. Specifically, each placed cell may have a common orientation relative to the respective reference point. For example, as shown in FIG. 5, each placed IBPG cell 506 has a common orientation relative to the respective reference point.

As a result of method 600, for a first cell and a second cell of the placed cells, (i) the first local metal track of the first cell is aligned with a first global metal track of the first type (ii) the second local metal track of the first cell is aligned with a first global metal track of the second type, where the first global metal track of the second type is adjacent to the first global metal track of the first type; (iii) the first local metal of the second cell is aligned to a second global metal track of the first type, where the second global metal track of the first type is adjacent to the first global metal track of the second type; and (iv) the second local metal track of the second cell is aligned to a second global metal of the second type, where the second global metal of the second type is adjacent to the second global metal track of the first type. For example, as shown in FIG. 5, the local power line VDD of first IBPG cell 506-1 is aligned with global power line VDD 502-2; the local ground line VSS of first IBPG cell 506-1 is aligned with global ground line VSS 504-2 that is adjacent to global power line VDD 502-2; the local power line VDD of second IBPG cell 506-2 is aligned with global power line VDD 502-3 that is adjacent to global ground line VSS 504-2; the local ground line VSS of second IBPG cell 506-2 is aligned with global ground line VSS 504-3 that is adjacent to global power line VDD 502-3.

Figure 7:
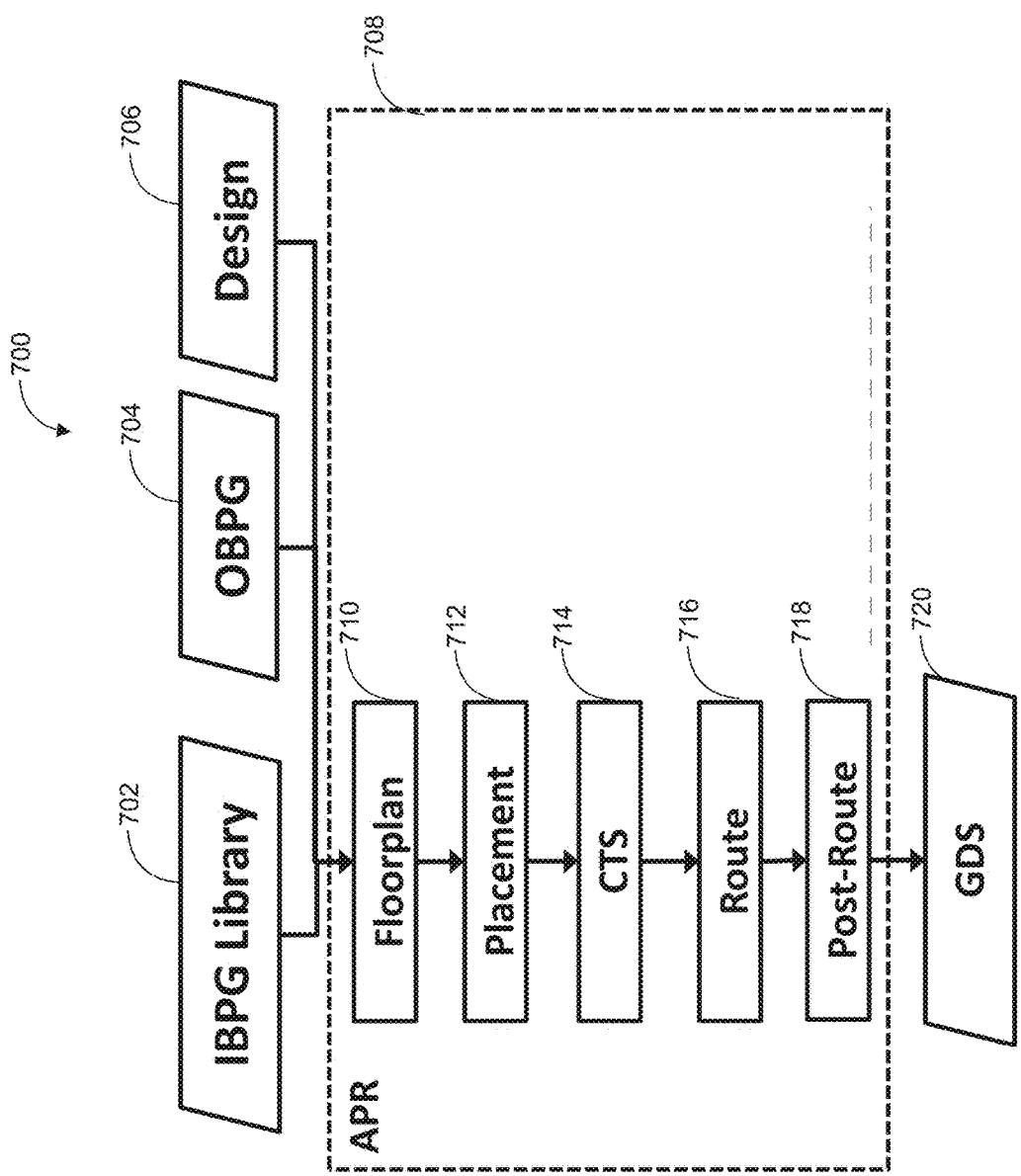
FIG. 7 is an illustration of an example an IC design flow using constrained cell placement, according to some embodiments of the present disclosure.

FIG. 7 is an illustration of an example diagram of another IC design flow 700 using constrained cell placement, according to some embodiments of the present disclosure. IC design flow 700 may be performed by EDA tools. IC design flow 700 includes an APR stage 708, which is part of physical design flow of an IC. In some embodiments, APR stage 708 may include multiple sub-stages, including floor plan 710, placement 712, CTS 714, route 716, and post-route 718. In some embodiments, APR stage 708 starts with obtaining inputs including IBPG cell library 702, OBPG cell library 704, and design 706, e.g., RTL design. The output of APR stage 708 may include IC layouts that can be converted into a mask work in the GDS format 720 or any other suitable formats, such as OASIS format.

In some embodiments, floor plan 710 may assign design 706 of the IC to gross regions of the chip, assign I/O pins, and place large objects (e.g., arrays, cores, etc.). Placement 712 may place cells (e.g., IBPG cells and/or OBPG cells) in cell libraries (e.g., IBPG cell library 702 and/or OBPG cell library 704) to non-overlapping locations in the layout area. CTS 714 may introduce clock signal wires (e.g., clock trees) into the design. Route 716 may add the wires that connect the cells placed during placement 712. Post-route 718 may include removing performance (time closure), noise (signal integrity), and yield violations. In some embodiments, post-route 718 may also include iterative refinement of cell and wire placement based on global routing and clock timing optimization.

The constrained IBPG cell placement of IC design flow 700 may be achieved without unifying PG locations in IBPG cell library 702. In some embodiments, PG locations for each IBPG cell in IBPG cell library 702 may be constrained during placement. It is to be appreciated that the IBPG cell placement may occur in placement 712, or any other suitable sub-stages of APR stage 708, such as CTS 714 or post-route 718. The details of the constrained-PG location IBPG cell placement are described below with respect to FIGS. 8 and 9.

Figure 8A:
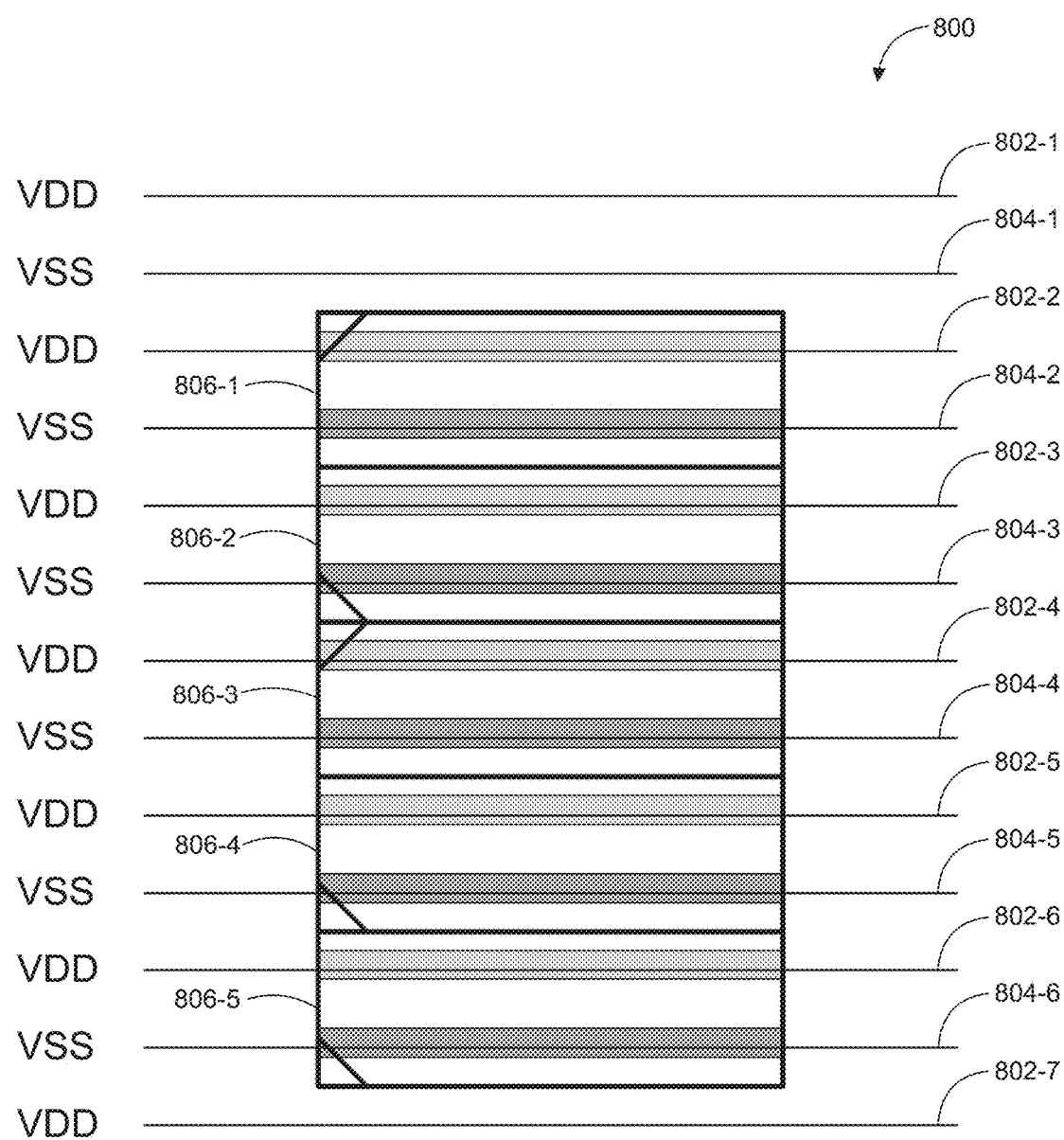
FIGS. 8A and 8B are illustrations of example IBPG cell placement with constrained-PG locations, according to some embodiments of the present disclosure.
Figure 8B:
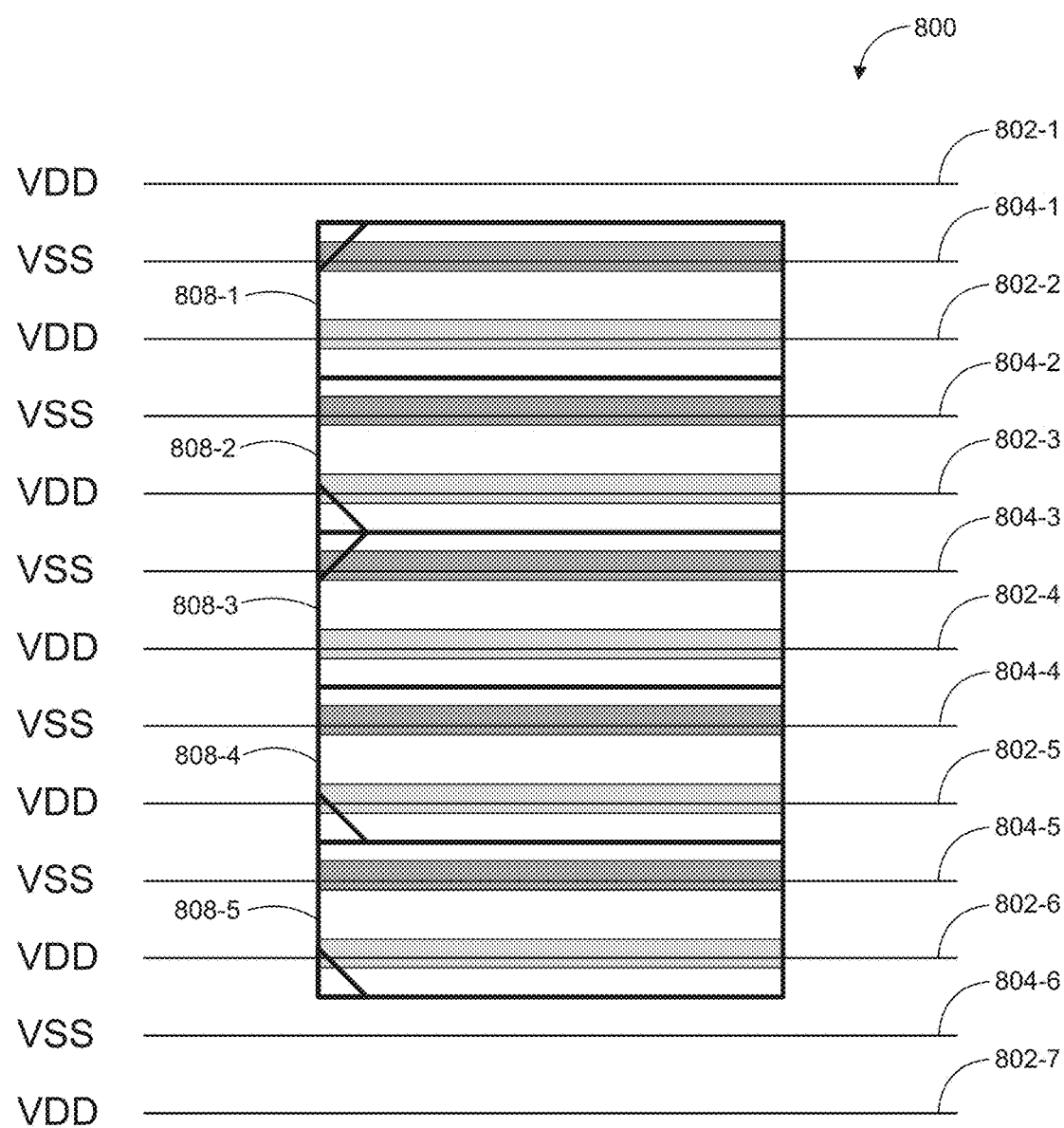

FIGS. 8A and 8B are illustrations of example IBPG cell placements with constrained-PG locations, according to some embodiments of the present disclosure. In FIG. 8A, IBPG cells 806 may not have unified relative local metal track locations relative to the respective reference point for each IBPG cell 806. Similarly, in FIG. 8B, IBPG cells 808 may not have unified relative local metal track locations relative to the respective reference point for each IBPG cell 808. That is, any IBPG cell library with standard IBPG cells with proper local metal tracks that match corresponding global metal tracks may be placed in a layout area 800 in FIGS. 8A and 8B.

Layout area 800 in FIGS. 8A and 8B may include a plurality of first global metal tracks 802 (e.g., power lines VDD) and a plurality of second global metal tracks 804 (e.g., ground lines VSS). First and second global metal tracks 802 and 804 may alternate between one another in layout area 800 with a uniform (or near uniform) pitch. In referring to FIG. 8A, once IBPG cells 806 from IBPG cell library 702 are placed in layout area 800, for each IBPG cell 806, the first local metal track (e.g., local power line VDD) may align with one of first global metal tracks (e.g., global power lines VDD), and the second local metal track (e.g., local ground line VSS) may align with one of second global metal tracks (e.g., global ground lines VSS). Also, as shown in FIG. 8A, after placement, for each IBPG cell 806, the first local metal track (e.g., local power line VDD) is above the second local metal track (e.g., local ground line VSS). That is, the placement imposes unified local metal track locations (e.g., one type of local metal track being above another type of local metal track after placement) to each IBPG cell 806.

Similarly, in FIG. 8B, the placement also imposes unified local metal track locations to each IBPG cell 808. Different from IBPG cells 806 in FIG. 8A, in FIG. 8B, after placement, for each IBPG cell 808, the first local metal track (e.g., local ground line VSS) is above the second local metal track (e.g., local power line VDD). Nevertheless, by ensuring that for each placed IBPG cell, the first local metal track is above the second local metal track, dead areas can be avoided between IBPG cells because any space between IBPG cells along the height can fit at least one IBPG cell. In contrast, as shown in FIG. 2, for placed IBPG cell 206-2, the first local metal track is above the second local metal track in layout area 200, while for other placed IBPG cells 206-1 and 206-3, the second local metal track is above the first local metal track in layout area 200. Thus, dead areas 208 are formed between IBPG cells 206 in FIG. 2.

Figure 9:
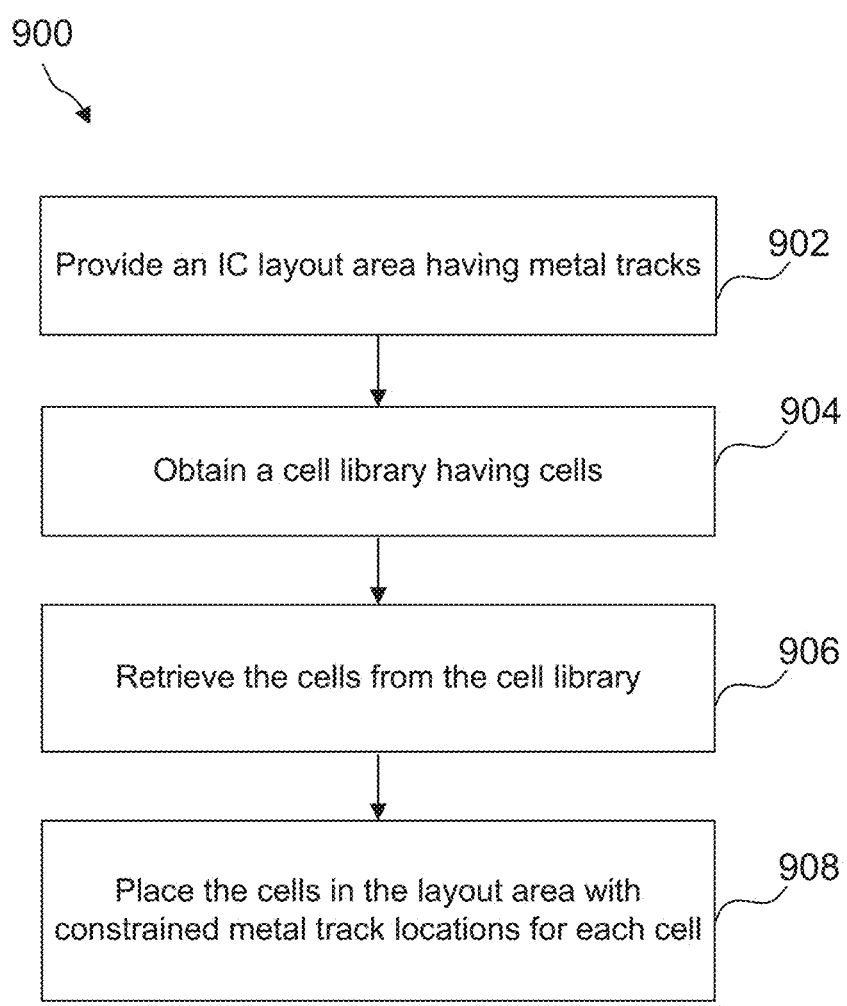
FIG. 9 is an illustration of a method for placing cells in layout, according to some embodiments of the present disclosure.

FIG. 9 is an illustration of a method 900 for placing cells in layout, according to some embodiments of the present disclosure. The operations depicted in method 900 can be performed by, for example, an EDA tool that operates on a computer system, such as an example computer system 1000 described below with respect to FIG. 10. It is to be appreciated that not all operations may be needed to perform the disclosure provided herein and that one or more additional operations may be performed. Further, some of the operations may be performed concurrently or in a different order than shown in FIG. 9.

In operation 902, an IC layout having two types of global metal tracks may be provided. Each of the plurality of global metal tracks of the first type and each of the plurality of global metal tracks of the second type may alternate between one another in the layout area. For example, as shown in FIGS. 8A and 8B, layout area 800 is provided with alternating power lines VDD 802 and ground lines VSS 804. The distance between alternating power lines VDD 802 and ground lines VSS 804 is equal (or near equal), according to some embodiments.

In operation 904, a cell library having standard cells may be obtained. Each cell may include a first local metal track proximate to a top boundary and a second local metal track proximate to a bottom boundary. For example, as shown in FIGS. 8A and 8B, IBPG cells 806 and 808 from IBPG cell library 702 do not need to have unified local metal track locations with respect to respective reference points.

In operation 906, the cells may be retrieved from the cell library. An EDA tool can retrieve, either automatically or by manual instruction, a cell from the cell library before placing the cell in the layout area.

In operation 908, the cells may be placed in the layout area with constrained local metal track locations for each cell. Specifically, each placed cell may have common local metal track locations. For example, as shown in FIG. 8A, for each placed IBPG cell 806, the local power line VDD is above the local ground line VSS; as shown in FIG. 8B, for each placed IBPG cell 808, the local ground line VSS is above the local power line VDD.

As a result of method 900, for a first cell and a second cell of the placed cells, (i) the first local metal track of the first cell is aligned with a first global metal track of the first type (ii) the second local metal track of the first cell is aligned with a first global metal track of the second type, where the first global metal track of the second type is adjacent to the first global metal track of the first type; (iii) the first local metal of the second cell is aligned to a second global metal track of the first type, where the second global metal track of the first type is adjacent to the first global metal track of the second type; and (iv) the second local metal track of the second cell is aligned to a second global metal of the second type, where the second global metal of the second type is adjacent to the second global metal track of the first type. For example, as shown in FIG. 8A, the local power line VDD of first IBPG cell 806-1 is aligned with global power line VDD 802-2; the local ground line VSS of first IBPG cell 806-1 is aligned with global ground line VSS 804-2 that is adjacent to global power line VDD 802-2; the local power line VDD of second IBPG cell 806-2 is aligned with global power line VDD 802-3 that is adjacent to global ground line VSS 804-2; the local ground line VSS of second IBPG cell 806-2 is aligned with global ground line VSS 804-3 that is adjacent to global power line VDD 802-3.

Figure 10:
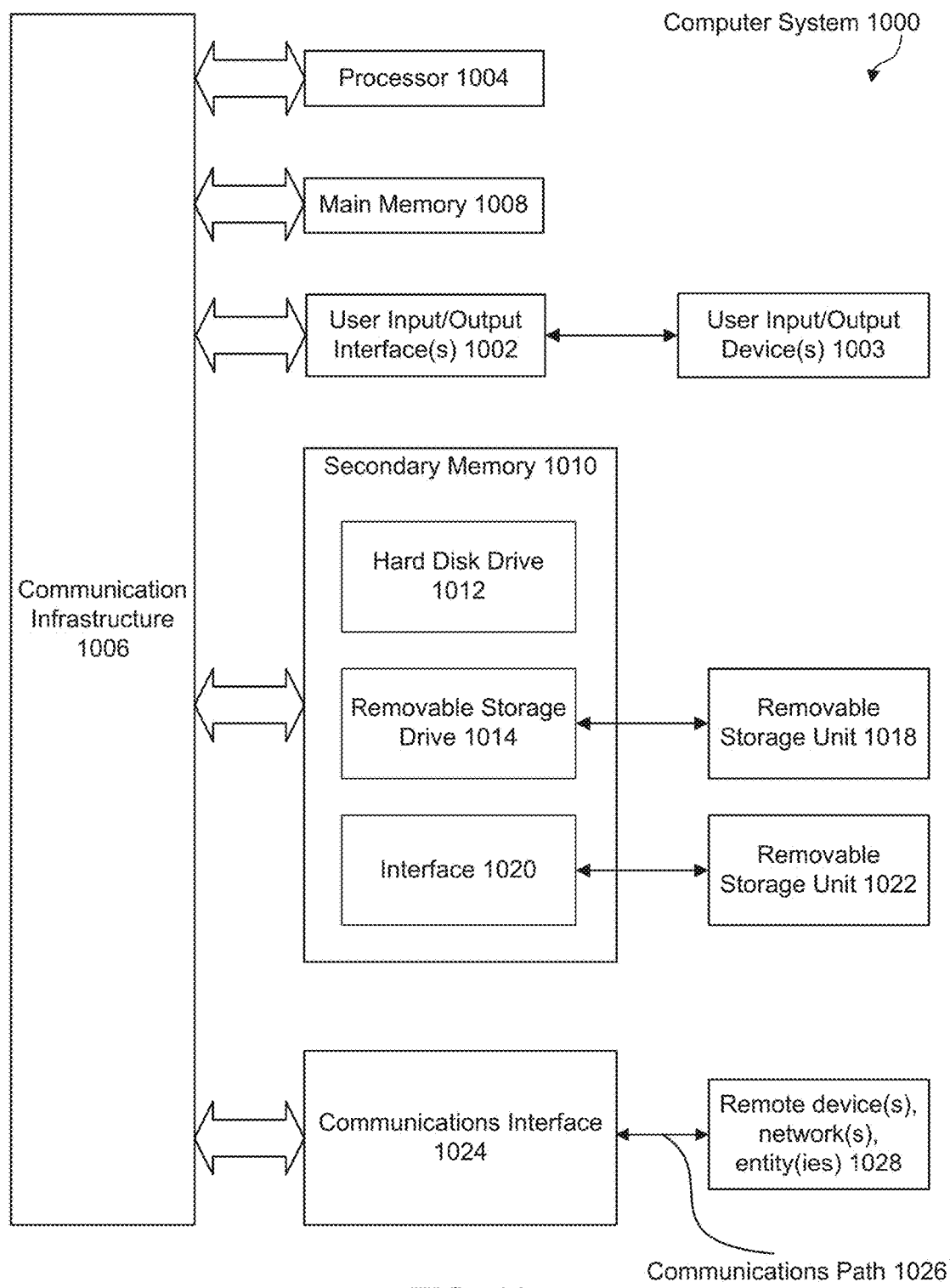
FIG. 10 is an illustration of an example computer system in which various embodiments of the present disclosure can be implemented, according to some embodiments of the present disclosure.

FIG. 10 is an illustration of an example computer system 1000 in which various embodiments of the present disclosure can be implemented, according to some embodiments. Computer system 1000 can be any well-known computer capable of performing the functions and operations described herein. For example, and without limitation, computer system 1000 can be capable of placing standard cells in an IC layout design using, for example, an EDA tool. Computer system 1000 can be used, for example, to execute one or more operations in methods 600 and 900, which describes example methods for placing cells in layout.

Computer system 1000 includes one or more processors (also called central processing units, or CPUs), such as a processor 1004. Processor 1004 is connected to a communication infrastructure or bus 1006. Computer system 1000 also includes input/output device(s) 1003, such as monitors, keyboards, pointing devices, etc., that communicate with communication infrastructure or bus 1006 through input/output interface(s) 1002. An EDA tool can receive instructions to implement functions and operations described herein—e.g., method 600 of FIG. 6 and method 900 of FIG. 9—via input/output device(s) 1003. Computer system 1000 also includes a main or primary memory 1008, such as random access memory (RAM). Main memory 1008 can include one or more levels of cache. Main memory 1008 has stored therein control logic (e.g., computer software) and/or data. In some embodiments, the control logic (e.g., computer software) and/or data can include one or more of the operations described above with respect to method 600 of FIG. 6 and method 900 of FIG. 9.

Computer system 1000 can also include one or more secondary storage devices or memory 1010. Secondary memory 1010 can include, for example, a hard disk drive 1012 and/or a removable storage device or drive 1014. Removable storage drive 1014 can be a floppy disk drive, a magnetic tape drive, a compact disk drive, an optical storage device, tape backup device, and/or any other storage device/drive.

Removable storage drive 1014 can interact with a removable storage unit 1018. Removable storage unit 1018 includes a computer usable or readable storage device having stored thereon computer software (control logic) and/or data. Removable storage unit 1018 can be a floppy disk, magnetic tape, compact disk, DVD, optical storage disk, and/any other computer data storage device. Removable storage drive 1014 reads from and/or writes to removable storage unit 1018 in a well-known manner.

According to some embodiments, secondary memory 1010 can include other means, instrumentalities or other approaches for allowing computer programs and/or other instructions and/or data to be accessed by computer system 1000. Such means, instrumentalities or other approaches can include, for example, a removable storage unit 1022 and an interface 1020. Examples of the removable storage unit 1022 and the interface 1020 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface. In some embodiments, secondary memory 1010, removable storage unit 1018, and/or removable storage unit 1022 can include one or more of the operations described above with respect to method 600 of FIG. 6 and method 900 of FIG. 9.

Computer system 1000 can further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 can allow computer system 1000 to communicate with remote devices 1028 over communications path 1026, which can be wired and/or wireless, and which can include any combination of LANs, WANs, the Internet, etc. Control logic and/or data can be transmitted to and from computer system 1000 via communication path 1026.

The operations in the preceding embodiments can be implemented in a wide variety of configurations and architectures. Therefore, some or all of the operations in the preceding embodiments—e.g., method 600 of FIG. 6 and method 900 of FIG. 9—can be performed in hardware, in software or both. In some embodiments, a tangible apparatus or article of manufacture comprising a tangible computer useable or readable medium having control logic (software) stored thereon is also referred to herein as a computer program product or program storage device. This includes, but is not limited to, computer system 1000, main memory 1008, secondary memory 1010 and removable storage units 1018 and 1022, as well as tangible articles of manufacture embodying any combination of the foregoing. Such control logic, when executed by one or more data processing devices (such as computer system 1000), causes such data processing devices to operate as described herein.

Figure 11:
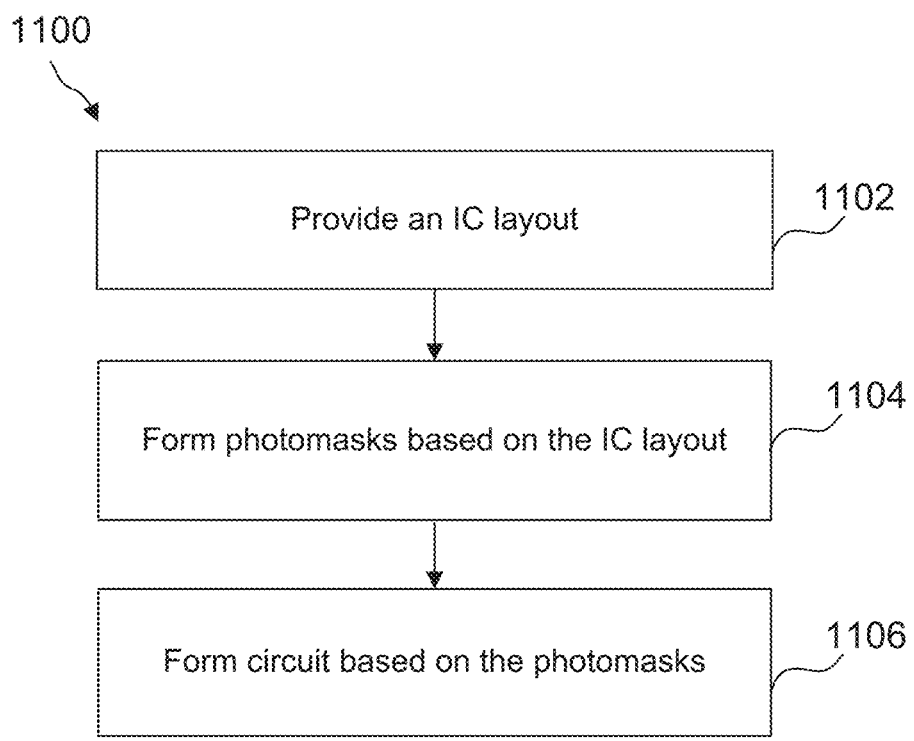
FIG. 11 is an illustration of a process to form a circuit based on a layout generated using constrained IBPG cell placement, according to some embodiments of the present disclosure.

FIG. 11 is an illustration of an exemplary method 1100 for circuit fabrication, according to some embodiments of the present disclosure. In some embodiments, operations of method 1100 can be performed in a different order. Variations of method 1100 should also be within the scope of the present disclosure.

In operation 1102, an IC layout is provided. The IC layout can be the layouts provided by FIGS. 3, 6, 7, and 9 above. The IC layout can be embodied in any suitable file format, such as but not limited to, GDS or OASIS format. For example, the IC layout can be checked for design rule violations and errors, and for confirmation that the errors and/or violations have been corrected. The operation depicted in 1102 can be performed by, for example, an EDA tool that operates on a computer system, such as computer system 1000 described above.

In operation 1104, photomasks are formed based on the IC layout, such as embodied in a GDS file. In some embodiments, the IC layout provided in operation 1102 is taken to a tape-out operation to generate photomasks for fabricating one or more integrated circuits. In some embodiments, the IC layout can be read and transferred onto a quartz or glass substrate to form opaque patterns that correspond to the circuit layout. The opaque patterns can be made of, for example, chromium or any other suitable metal. Operation 1104 can be performed by a photomask manufacturer, where the circuit layout is read using a suitable software tool (e.g., an EDA tool) and the circuit layout is transferred onto a substrate using a suitable printing/deposition tool. The photomasks reflect the circuit layout/features included in the IC layout files, such as GDS files.

In operation 1106, one or more circuits are formed based on the photomasks generated in operation 1104. In some embodiments, the photomasks are used to form patterns/structures of the circuit contained in the IC layout. In some embodiments, various fabrication tools (e.g., photolithography equipment, deposition equipment, and etching equipment) are used to form features of the one or more circuits.

The disclosed embodiments relate to optimizing placement of standard cells (e.g., cells that implement logic or other electronic functions) in an IC layout design. In some embodiments, a cell library includes cells (e.g., IBPG cells) with unified metal track (e.g., PG) locations. The cells in the cell library are placed in an IC layout area having metal tracks (e.g., PG lines) with constrained orientations for each cell. In some embodiments, unified metal track locations are not required for cells (e.g., IBPG cells) in the cell library. The cells in the cell library are placed in the IC layout area with constrained metal tracks (e.g., PG lines) locations for each cell. By utilizing the cell placement methods disclosed herein, dead space between cells (e.g., IBPG cells) can be reduced or eliminated, which in turn optimizes the placement of standard cells in the IC layout design.

Embodiments of the present disclosure describe a method for cell placement. The method includes. retrieving, from a cell library, a first and a second cells each including a first local metal track proximate to a top boundary and a second local metal track proximate to a bottom boundary. The method also includes placing, by a processor, the first and second cells in a layout area including global metal tracks of a first type and global metal tracks of a second type. Each global metal track of the first type and each global metal tracks of the second type alternate between one another in the layout area. The first local metal track of the first cell is aligned with a first global metal track of the first type. The second local metal track of the first cell is aligned with a first global metal track of the second type. The first global metal track of the second type is adjacent to the first global metal track of the first type. The first local metal of the second cell is aligned to a second global metal track of the first type. The second global metal track of the first type is adjacent to the first global metal track of the second type. The second local metal track of the second cell is aligned to a second global metal of the second type. The second global metal of the second type is adjacent to the second global metal track of the first type.

Embodiments of the present disclosure describe a system with a memory and a processor. The memory is configured to store instructions. When executing the instructions, the process is configured to operations that include retrieving, from a cell library, a first and a second cells each including a first local metal track proximate to a top boundary and a second local metal track proximate to a bottom boundary. The operations also include placing the first and second cells in a layout area including global metal tracks of a first type and global metal tracks of a second type. Each global metal track of the first type and each global metal tracks of the second type alternate between one another in the layout area. The first local metal track of the first cell is aligned with a first global metal track of the first type. The second local metal track of the first cell is aligned with a first global metal track of the second type. The first global metal track of the second type is adjacent to the first global metal track of the first type. The first local metal of the second cell is aligned to a second global metal track of the first type. The second global metal track of the first type is adjacent to the first global metal track of the second type. The second local metal track of the second cell is aligned to a second global metal of the second type. The second global metal of the second type is adjacent to the second global metal track of the first type.

Embodiments of the present disclosure describe a non-transitory computer-readable medium having instructions stored thereon that, when executed by a computing device, causes the computing device to perform operations. The operations include retrieving, from a cell library, a first and a second cells each including a first local metal track proximate to a top boundary and a second local metal track proximate to a bottom boundary. The operations also include placing the first and second cells in a layout area including global metal tracks of a first type and global metal tracks of a second type. Each global metal track of the first type and each global metal tracks of the second type alternate between one another in the layout area. The first local metal track of the first cell is aligned with a first global metal track of the first type. The second local metal track of the first cell is aligned with a first global metal track of the second type. The first global metal track of the second type is adjacent to the first global metal track of the first type. The first local metal of the second cell is aligned to a second global metal track of the first type. The second global metal track of the first type is adjacent to the first global metal track of the second type. The second local metal track of the second cell is aligned to a second global metal of the second type. The second global metal of the second type is adjacent to the second global metal track of the first type.

It is to be appreciated that the Detailed Description section, and not the Abstract of the Disclosure section, is intended to be used to interpret the claims. The Abstract of the Disclosure section may set forth one or more but not all possible embodiments of the present disclosure as contemplated by the inventor(s), and thus, are not intended to limit the subjoined claims in any way.

The foregoing disclosure outlines features of several embodiments so that those skilled in the art may better understand the aspects of the present disclosure. Those skilled in the art will appreciate that they may readily use the present disclosure as a basis for designing or modifying other processes and structures for carrying out the purposes and/or achieving the advantages of the embodiments disclosed herein. Those skilled in the art will also realize that such equivalent constructions do not depart from the spirit and scope of the present disclosure, and that they may make various changes, substitutions, and alterations herein without departing from the spirit and scope of the present disclosure.

What is claimed is:

1. A method for cell placement, comprising:
retrieving, from a cell library, a first cell and a second cell that each comprises a first local metal track proximate to a top boundary and a second local metal track proximate to a bottom boundary; and
placing, by a processor, the first and second cells in a layout area comprising a plurality of global metal tracks of a first type and a plurality of global metal tracks of a second type, each of the plurality of global metal tracks of the first type and each of the plurality of global metal tracks of the second type alternating between one another in the layout area, wherein:
the first local metal track of the first cell is aligned with a first global metal track of the first type;
the second local metal track of the first cell is aligned with a first global metal track of the second type, wherein the first global metal track of the second type is adjacent to the first global metal track of the first type;
the first local metal track of the second cell is aligned to a second global metal track of the first type, wherein the second global metal track of the first type is adjacent to the first global metal track of the second type; and
the second local metal track of the second cell is aligned to a second global metal track of the second type, wherein the second global metal track of the second type is adjacent to the second global metal track of the first type.

2. The method of claim 1, wherein:
each of the first and second cells comprises a reference point;
for each of the first and second cells, the first local metal track is closer to the reference point than the second local metal track.

3. The method of claim 2, wherein, after the placing, each of the first and second cells has a common orientation relative to a respective reference point.

4. The method of claim 1, wherein:
each of the plurality of global metal tracks of the first type corresponds to a power line; and
each of the plurality of global metal tracks of the second type corresponds to a ground line.

5. The method of claim 1, wherein:
each of the plurality of global metal tracks of the first type corresponds to a ground line; and
each of the plurality of global metal tracks of the second type corresponds to a power line.

6. The method of claim 1, wherein for each of the first and second cells, a height between the top and bottom boundaries is equal to twice a distance between the first and second local metal tracks.

7. The method of claim 1, wherein:
each of the first and second cells has an equal height measured between respective top and bottom boundaries; and
each of the plurality of global metal tracks of the first and second types in the layout area has an equal distance from one another.

8. The method of claim 7, wherein for each of the first and second cells, a distance between the first and second local metal tracks is equal to a distance between each of the plurality of global metal tracks of the first and second types in the layout area.

9. A computer system comprising:
a memory configured to store instructions; and
a processor, that when executing the instructions, is configured to perform operations comprising:
retrieving, from a cell library, a first cell and a second cell that each comprises a first local metal track proximate to a top boundary and a second local metal track proximate to a bottom boundary; and
placing the first and second cells in a layout area comprising a plurality of global metal tracks of a first type and a plurality of global metal tracks of a second type, each of the plurality of global metal tracks of the first type and each of the plurality of global metal tracks of the second type alternating between one another in the layout area, wherein:
the first local metal track of the first cell is aligned with a first global metal track of the first type;
the second local metal track of the first cell is aligned with a first global metal track of the second type, wherein the first global metal track of the second type is adjacent to the first global metal track of the first type;
the first local metal track of the second cell is aligned to a second global metal track of the first type, wherein the second global metal track of the first type is adjacent to the first global metal track of the second type; and
the second local metal track of the second cell is aligned to a second global metal track of the second type, wherein the second global metal track of the second type is adjacent to the second global metal track of the first type.

10. The computer system of claim 9, wherein:
each of the first and second cells comprises a reference point;
for each of the first and second cells, the first local metal track is closer to the reference point than the second local metal track.

11. The computer system of claim 10, wherein, after the placing, each of the first and second cells has a common orientation relative to a respective reference point.

12. The computer system of claim 9, wherein:
each of the plurality of global metal tracks of the first type corresponds to a power line; and
each of the plurality of global metal tracks of the second type corresponds to a ground line.

13. The computer system of claim 9, wherein:
each of the plurality of global metal tracks of the first type corresponds to a ground line; and
each of the plurality of global metal tracks of the second type corresponds to a power line.

14. The computer system of claim 9, wherein for each of the first and second cells, a height between the top and bottom boundaries is equal to twice a distance between the first and second local metal tracks.

15. The computer system of claim 9, wherein:
each of the first and second cells has an equal height measured between respective top and bottom boundaries; and
each of the global metal tracks of the first and second types in the layout area has an equal distance from one another.

16. The computer system of claim 15, wherein for each of the first and second cells, a distance between the first and second local metal tracks is equal to a distance between each of the plurality of global metal tracks of the first and second types in the layout area.

17. A non-transitory computer-readable medium having instructions stored thereon that, when executed by a computing device, causes the computing device to perform operations comprising:
retrieving, from a cell library, a first cell and a second cell that each comprises a first local metal track proximate to a top boundary and a second local metal track proximate to a bottom boundary; and
placing the first and second cells in a layout area comprising a plurality of global metal tracks of a first type and a plurality of global metal tracks of a second type, each of the plurality of global metal tracks of the first type and each of the plurality of global metal tracks of the second type alternating between one another in the layout area, wherein:
the first local metal track of the first cell is aligned with a first global metal track of the first type;
the second local metal track of the first cell is aligned with a first global metal track of the second type, wherein the first global metal track of the second type is adjacent to the first global metal track of the first type;
the first local metal track of the second cell is aligned to a second global metal track of the first type, wherein the second global metal track of the first type is adjacent to the first global metal track of the second type; and
the second local metal track of the second cell is aligned to a second global metal track of the second type, wherein the second global metal track of the second type is adjacent to the second global metal track of the first type.

18. The non-transitory computer-readable medium of claim 17, wherein:
each of the first and second cells comprises a reference point;
for each of first and second cells, the first local metal track is closer to the reference point than the second local metal track.

19. The non-transitory computer-readable medium of claim 18, wherein, after the placing, each of first and second cells has a common orientation relative to a respective reference point.

20. The non-transitory computer-readable medium of claim 17, wherein for each of the first and second cells, a height between the top and bottom boundaries is equal to twice a distance between the first and second local metal tracks.

* * * * *